(12) United States Patent
Campbell (10) Patent No.: US 7,889,932 B2
(45) Date of Patent: *Feb. 15, 2011

(54) METHODS AND SYSTEMS FOR DETECTING REGIONS IN DIGITAL IMAGES

(75) Inventor: Richard John Campbell, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 976 days.

This patent is subject to a terminal disclaimer.

(21) Appl. No.: 11/367,244

(22) Filed: Mar. 2, 2006

(65) Prior Publication Data

US 2007/0206855 A1 Sep. 6, 2007

(51) Int. Cl.
*G06K 9/74* (2006.01)
(52) U.S. Cl. .............. 382/212; 358/462; 358/464; 382/171; 382/175; 382/176; 382/224
(58) Field of Classification Search ............... 358/462, 358/464, 534, 540; 382/172, 178, 190, 212, 382/224, 232, 171, 175, 176
See application file for complete search history.

(56) References Cited

U.S. PATENT DOCUMENTS

| | | |
|---|---|---|
| 4,414,635 A | 11/1983 | Gast et al. |
| 4,741,046 A | 4/1988 | Matsunawa |
| 5,001,767 A | 3/1991 | Yoneda et al. |
| 5,034,988 A * | 7/1991 | Fujiwara ............ 382/130 |
| 5,157,740 A | 10/1992 | Klein et al. |
| 5,280,367 A | 1/1994 | Zuniga |
| 5,293,430 A | 3/1994 | Shiau |
| 5,339,172 A | 8/1994 | Robinson |
| 5,348,474 A | 9/1994 | Pasini |
| 5,353,132 A | 10/1994 | Katsuma |
| 5,379,130 A | 1/1995 | Wang et al. |
| 5,481,622 A | 1/1996 | Gerhardt et al. |
| 5,581,667 A | 12/1996 | Bloomberg |
| 5,588,072 A | 12/1996 | Wang |
| 5,642,137 A | 6/1997 | Kitazumi |
| 5,649,025 A | 7/1997 | Revankar |
| 5,682,249 A | 10/1997 | Harrington et al. |
| 5,689,575 A | 11/1997 | Sako et al. |
| 5,694,228 A | 12/1997 | Peairs et al. |
| 5,696,842 A | 12/1997 | Shirasawa |

(Continued)

FOREIGN PATENT DOCUMENTS

JP 07-107275 A 4/1995

(Continued)

OTHER PUBLICATIONS

Jean Duong et al, Extraction of Text Areas in Printed Document Images, Nov. 9-10, 2001, pp. 157-165, ACM Symposium on Document Engineering.*

(Continued)

*Primary Examiner*—Gregory M Desire
(74) *Attorney, Agent, or Firm*—Kristine E. Matthews; David C. Ripma (57) ABSTRACT

Embodiments of the present invention comprise systems, methods and devices for detection of image regions of various content types using a masking condition and an entropy measure.

16 Claims, 8 Drawing Sheets

U.S. PATENT DOCUMENTS

| | | | |
|---|---|---|---|
| 5,767,978 A | 6/1998 | Revankar | |
| 5,768,403 A | 6/1998 | Suzuki | |
| 5,778,092 A * | 7/1998 | MacLeod et al. | 382/176 |
| 5,809,167 A | 9/1998 | Al-Hussein | |
| 5,848,185 A | 12/1998 | Koga et al. | |
| 5,854,853 A | 12/1998 | Wang | |
| 5,867,277 A | 2/1999 | Melen et al. | |
| 5,900,953 A | 5/1999 | Bottou et al. | |
| 5,903,363 A | 5/1999 | Yaguchi et al. | |
| 5,923,775 A * | 7/1999 | Snyder et al. | 382/172 |
| 5,943,443 A | 8/1999 | Itonori et al. | |
| 5,946,420 A | 8/1999 | Noh | |
| 5,949,555 A | 9/1999 | Sakai et al. | |
| 5,956,468 A | 9/1999 | Ancin | |
| 5,987,171 A | 11/1999 | Wang | |
| 5,995,665 A | 11/1999 | Maeda | |
| 6,020,979 A | 2/2000 | Zeck et al. | |
| 6,084,984 A | 7/2000 | Ishikawa | |
| 6,175,427 B1 | 1/2001 | Lembeck et al. | |
| 6,175,650 B1 | 1/2001 | Sindhu et al. | |
| 6,178,260 B1 | 1/2001 | Li et al. | |
| 6,198,797 B1 | 3/2001 | Majima et al. | |
| 6,215,904 B1 | 4/2001 | Lavallee | |
| 6,222,932 B1 * | 4/2001 | Rao et al. | 382/100 |
| 6,233,353 B1 | 5/2001 | Danisewicz | |
| 6,246,791 B1 | 6/2001 | Kurzweil et al. | |
| 6,256,413 B1 | 7/2001 | Hirabayashi | |
| 6,272,240 B1 | 8/2001 | Li et al. | |
| 6,298,173 B1 | 10/2001 | Lopresti | |
| 6,301,381 B1 | 10/2001 | Hayashi | |
| 6,308,179 B1 | 10/2001 | Petersen et al. | |
| 6,347,153 B1 | 2/2002 | Triplett et al. | |
| 6,360,009 B2 | 3/2002 | Li et al. | |
| 6,373,981 B1 | 4/2002 | de Queiroz et al. | |
| 6,389,164 B2 | 5/2002 | Li et al. | |
| 6,400,844 B1 | 6/2002 | Fan et al. | |
| 6,473,522 B1 | 10/2002 | Lienhart et al. | |
| 6,522,791 B2 | 2/2003 | Nagarajan | |
| 6,526,181 B1 | 2/2003 | Smith et al. | |
| 6,577,762 B1 | 6/2003 | Seeger et al. | |
| 6,594,401 B1 | 7/2003 | Metcalfe et al. | |
| 6,661,907 B2 | 12/2003 | Ho et al. | |
| 6,718,059 B1 | 4/2004 | Uchida | |
| 6,728,391 B1 | 4/2004 | Wu et al. | |
| 6,728,399 B1 | 4/2004 | Doll | |
| 6,731,789 B1 | 5/2004 | Tojo | |
| 6,731,800 B1 | 5/2004 | Barthel et al. | |
| 6,766,053 B2 | 7/2004 | Fan et al. | |
| 6,778,291 B1 | 8/2004 | Clouthier | |
| 6,782,129 B1 | 8/2004 | Li et al. | |
| 6,901,164 B2 | 5/2005 | Sheffer | |
| 6,950,114 B2 * | 9/2005 | Honda et al. | 345/626 |
| 6,993,185 B2 * | 1/2006 | Guo et al. | 382/176 |
| 7,020,332 B2 * | 3/2006 | Nenonen et al. | 382/169 |
| 7,027,647 B2 | 4/2006 | Mukherjee et al. | |
| 7,062,099 B2 * | 6/2006 | Li et al. | 382/237 |
| 7,079,687 B2 * | 7/2006 | Guleryuz | 382/180 |
| 7,133,565 B2 | 11/2006 | Toda et al. | |
| 7,181,059 B2 | 2/2007 | Duvdevani et al. | |
| 7,190,409 B2 | 3/2007 | Yamazaki et al. | |
| 7,206,443 B1 | 4/2007 | Duvdevani et al. | |
| 7,221,805 B1 * | 5/2007 | Bachelder | 382/255 |
| 7,483,484 B2 | 1/2009 | Liu et al. | |
| 7,518,755 B2 | 4/2009 | Gotoh et al. | |
| 2001/0016077 A1 * | 8/2001 | Oki | 382/240 |
| 2001/0050785 A1 * | 12/2001 | Yamazaki | 358/540 |
| 2002/0031268 A1 | 3/2002 | Prabhakar et al. | |
| 2002/0037100 A1 | 3/2002 | Toda et al. | |
| 2002/0064307 A1 | 5/2002 | Koga et al. | |
| 2002/0076103 A1 | 6/2002 | Lin et al. | |
| 2002/0110283 A1 | 8/2002 | Fan et al. | |
| 2002/0168105 A1 | 11/2002 | Li | |
| 2003/0086127 A1 | 5/2003 | Ito et al. | |
| 2003/0107753 A1 | 6/2003 | Sakamoto | |
| 2003/0133612 A1 | 7/2003 | Fan | |
| 2003/0133617 A1 | 7/2003 | Mukherjee | |
| 2003/0156760 A1 | 8/2003 | Navon et al. | |
| 2004/0001624 A1 | 1/2004 | Curry et al. | |
| 2004/0001634 A1 | 1/2004 | Mehrotra | |
| 2004/0042659 A1 | 3/2004 | Guo et al. | |
| 2004/0083916 A1 | 5/2004 | Isshiki | |
| 2004/0096102 A1 | 5/2004 | Handley | |
| 2004/0179742 A1 * | 9/2004 | Li | 382/239 |
| 2004/0190027 A1 | 9/2004 | Foster et al. | |
| 2004/0190028 A1 | 9/2004 | Foster et al. | |
| 2004/0205568 A1 | 10/2004 | Breuel et al. | |
| 2004/0240733 A1 * | 12/2004 | Hobson et al. | 382/170 |
| 2005/0008221 A1 | 1/2005 | Hull et al. | |
| 2005/0100219 A1 * | 5/2005 | Berkner et al. | 382/190 |
| 2005/0100220 A1 * | 5/2005 | Keaton et al. | 382/191 |
| 2005/0129310 A1 | 6/2005 | Herley | |
| 2005/0163374 A1 * | 7/2005 | Ferman et al. | 382/176 |
| 2005/0174586 A1 | 8/2005 | Yoshida et al. | |
| 2005/0180647 A1 | 8/2005 | Curry et al. | |
| 2005/0281474 A1 * | 12/2005 | Huang | 382/239 |
| 2005/0286758 A1 * | 12/2005 | Zitnick et al. | 382/154 |
| 2006/0072830 A1 * | 4/2006 | Nagarajan et al. | 382/224 |
| 2006/0133690 A1 | 6/2006 | Bloomberg et al. | |
| 2006/0153441 A1 * | 7/2006 | Li | 382/162 |
| 2006/0221090 A1 | 10/2006 | Takeshima et al. | |
| 2006/0229833 A1 * | 10/2006 | Pisupati et al. | 702/64 |
| 2006/0269159 A1 * | 11/2006 | Kim et al. | 382/256 |
| 2007/0291120 A1 | 12/2007 | Campbell et al. | |
| 2008/0212864 A1 * | 9/2008 | Bornefalk | 382/132 |

FOREIGN PATENT DOCUMENTS

| | | |
|---|---|---|
| JP | 08-065514 A | 3/1996 |
| JP | 2002-325182 | 11/2002 |
| JP | 2003-123072 A | 4/2003 |
| JP | 2004-110606 A | 4/2004 |
| JP | 2007-235953 A | 9/2007 |
| WO | 2005/067586 A2 | 7/2005 |
| WO | 2006/066325 A1 | 6/2006 |

OTHER PUBLICATIONS

Feng et al., "Exploring the Use of Conditional Random Field Models and HMMs for Historical Handwritten Document Recognition," DIAL'06, Apr. 2006, pp. 1-8, IEEE.

Richard Berry and Jim Burnell, "The histogram is a graph of pixel value versus the number of pixels having that value," 2000, pp. 1-3, from: www.willbell.com/AIP4Win_Updater/Histogram%20Tool.pdf.

Rainer Lienhart and Axel Wernicke, "Localizing and Segmenting Text in Images and Videos," IEEE Transactions on Circuits and Systems for Video Technology, Apr. 2002, pp. 256-268, vol. 12, No. 4, IEEE, USA.

U.S. Appl. No. 11/424,281—Office Action dated Jun. 9, 2009.
U.S. Appl. No. 11/424,296—Office action dated Apr. 2, 2009.
U.S. Appl. No. 11/424,297—Office action dated Apr. 28, 2009.
U.S. Appl. No. 11/424,290—Office action dated Nov. 27, 2007.
U.S. Appl. No. 11/424,290—Office action dated May 28, 2008.
U.S. Appl. No. 11/424,290—Office action dated Oct. 27, 2008.
U.S. Appl. No. 11/424,290—Supplemental Office action dated Feb. 10, 2009.
Japanese Patent Application No. 2007-229562—Office action—Mailing date Mar. 3, 2009.
U.S. Appl. No. 11/424,296—Office action dated Oct. 28, 2009.
U.S. Appl. No. 11/424,281—Office action dated Nov. 13, 2009.
U.S. Appl. No. 11/424,297—Office action dated Oct. 22, 2009.
Japanese Patent Application No. 2007-035511—Office action—Mailing date Jul. 21, 2009.
Japanese Patent Application No. 2007-035511—Office action—Mailing date Dec. 15, 2009.

U.S. Appl. No. 11/424,290—Office action dated Jul. 17, 2009.
U.S. Appl. No. 11/424,297—Office action dated May 5, 2010.
U.S. Appl. No. 11/470,519—Office action dated May 27, 2010.

U.S. Appl. No. 11/424,296—Office action dated Apr. 16, 2010.

* cited by examiner

METHODS AND SYSTEMS FOR DETECTING REGIONS IN DIGITAL IMAGES

FIELD OF THE INVENTION

Embodiments of the present invention comprise methods and systems for automatically detecting regions in digital images.

BACKGROUND

The content of a digital image can have considerable impact on the compression of the digital image, both in terms of compression efficiency and compression artifacts. Pictorial regions in an image are not efficiently compressed using compression algorithms designed for the compression of text. Similarly, text images are not efficiently compressed using compression algorithms that are designed and optimized for pictorial content. Not only is compression efficiency affected when a compression algorithm designed for one type of image content is used on a different type of image content, but the decoded image may exhibit annoying compression artifacts.

Further, image enhancement algorithms designed to sharpen text, if applied to pictorial image content, may produce visually annoying artifacts in some areas of the pictorial content. In particular, those areas of the pictorial content containing strong edges may be affected. While smoothing operations may enhance a natural image, the smoothing of text regions is seldom desirable.

The detection of regions of a particular content type in a digital image can improve compression efficiency, reduce compression artifacts, and improve image quality when used in conjunction with a compression algorithm or image enhancement algorithm designed for the particular type of content.

The semantic labeling of image regions based on content is also useful in document management systems and image databases.

Reliable and efficient detection of regions of pictorial content type and other image regions in digital images is desirable.

SUMMARY

Embodiments of the present invention comprise methods and systems for classifying an image into regions using a masking condition and an entropy measure.

The foregoing and other objectives, features, and advantages of the invention will be more readily understood upon consideration of the following detailed description of the invention taken in conjunction with the accompanying drawings.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Figure 1:
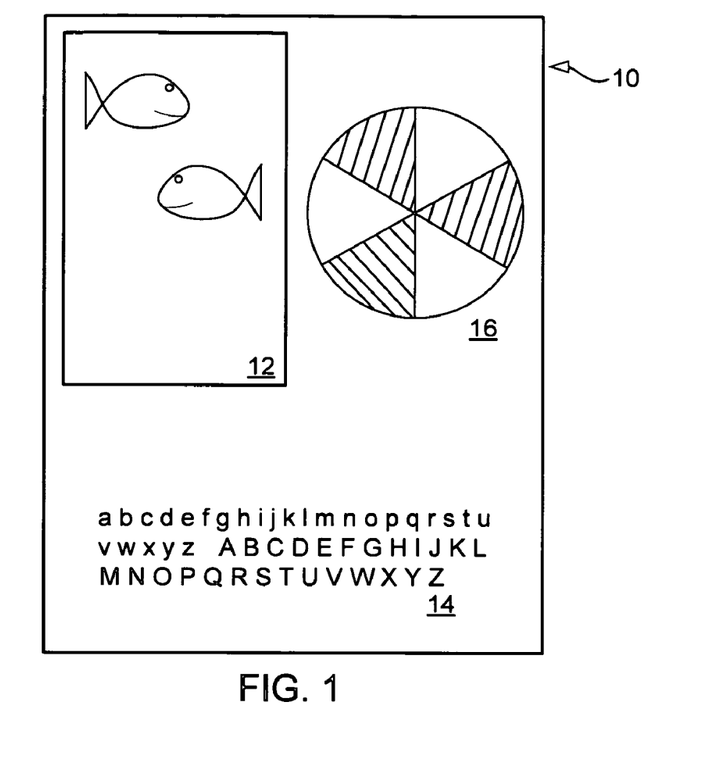
FIG. 1 is an example of an image comprising a multiplicity of regions of different content type.

FIG. 1 shows an image 10 comprising three regions: a pictorial region 12, a text region 14, and a graphics region 16. For many image processing, compression, document management, and other applications, it may be desirable to detect various regions in an image. Exemplary regions may include: a pictorial region, a text region, a graphics region, a half-tone region, a continuous-tone region, a color region, a black-and-white region, a region best compressed by Joint Photographic Experts Group (JPEG) compression, a region best compressed by Joint Bi-level Image Experts Group (JBIG) compression, a background region, and a foreground region.

Figure 2:
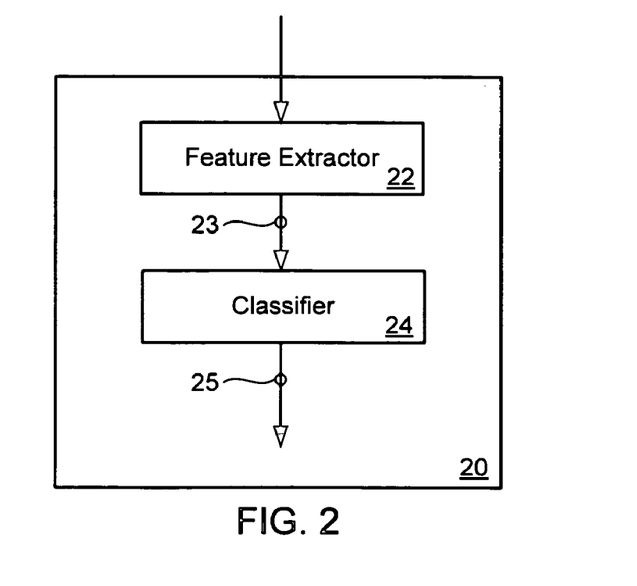
FIG. 2 is a diagram of an exemplary region-detection system (prior art)

An exemplary region-detection system 20 is shown in FIG. 2. A region-detection system 20 may include a feature extractor 22 and a classifier 24. The feature extractor 22 may measure, calculate, or in some way extract, a feature or features 23 from the image. The classifier 24 may classify portions of the image based on the extracted feature or features 23. The classification 25 produced by the classifier 24 thereby provides detection of image regions.

Figure 3:
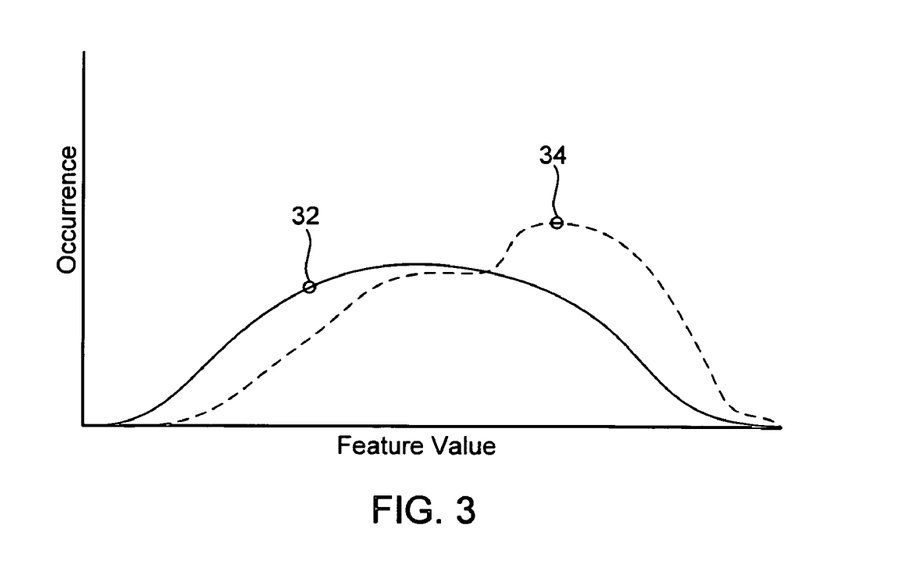
FIG. 3 is an exemplary histogram showing feature value separation.

The effectiveness and reliability of a region-detection system may depend on the feature or features used for the classification. FIG. 3 shows an example of a normalized frequency-of-occurrence plot of feature values for two image regions. The solid line 32 shows the frequency of occurrence of feature values extracted from image samples belonging to one region. The dashed line 34 shows the frequency of occurrence of feature values extracted from image samples belonging to a second region. The strong overlap of these two histograms may indicate that the feature may not be an effective feature for separating image samples belonging to one of these two regions.

Figure 4:
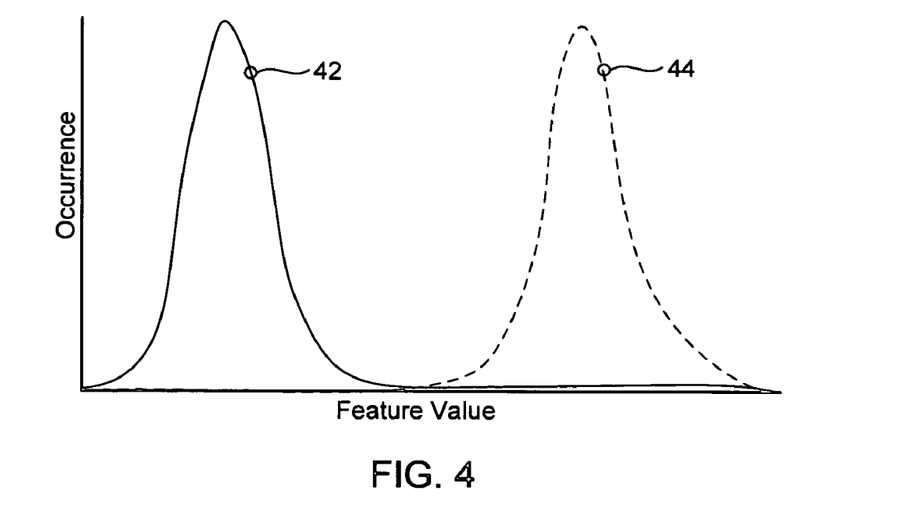
FIG. 4 is an exemplary histogram showing feature value separation.

FIG. 4 shows another example of a normalized frequency of occurrence plot of feature values for two image regions. The solid line 42 shows the frequency of occurrence of feature values extracted from image samples belonging to one region. The dashed line 44 shows the frequency of occurrence of feature values extracted from image samples belonging to a second region. The wide separation of these two histograms may indicate that the feature will be an effective feature for classifying image samples as belonging to one of these two regions.

Embodiments of the present invention comprise methods and systems for region detection in a digital image. Some embodiments of the present invention comprise methods and systems for region detection in a digital image wherein the separation between feature values corresponding to image regions may be accomplished by masking, prior to feature extraction, pixels in the image for which a masking condition is met. In some embodiments, the masked pixel values may not be used when extracting the feature value from the image.

Figure 5:
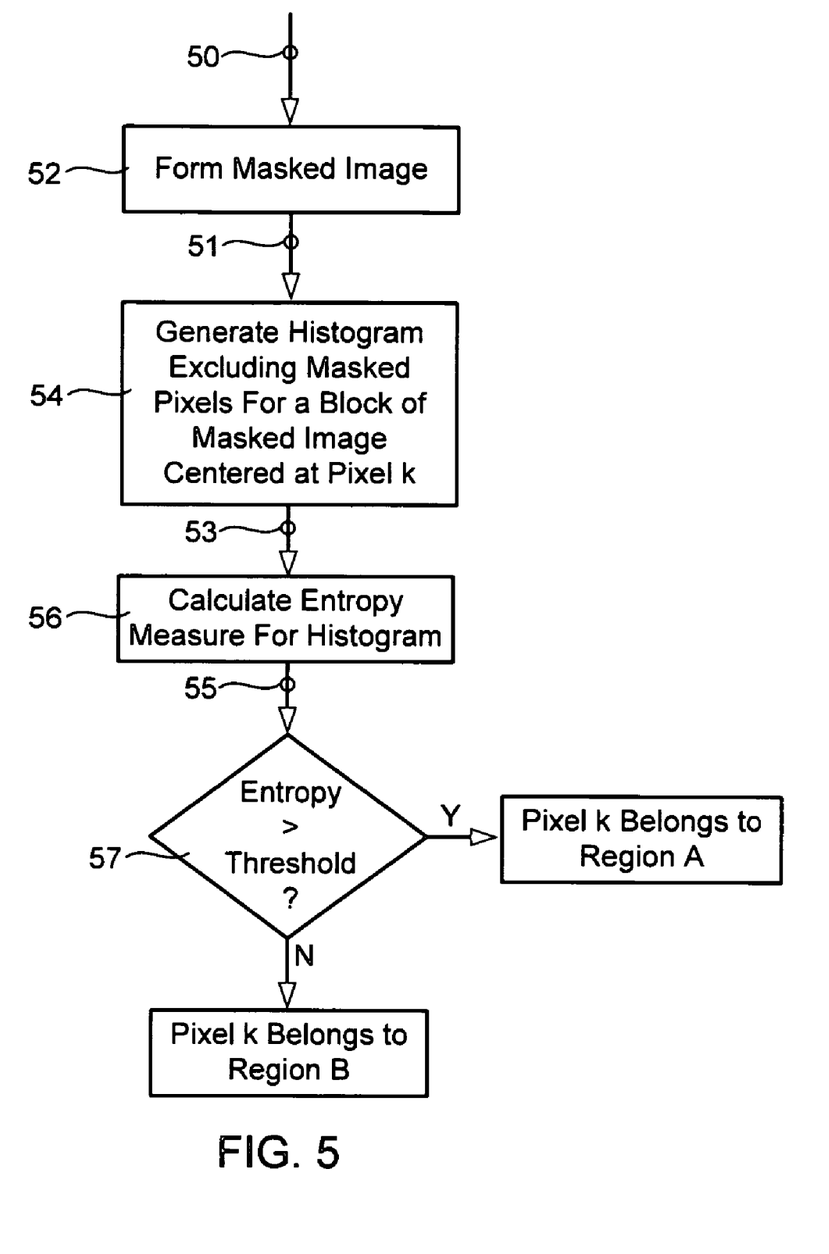
FIG. 5 is a diagram showing exemplary embodiments of the present invention comprising a masked-entropy calculation from a histogram.
Figure 6:
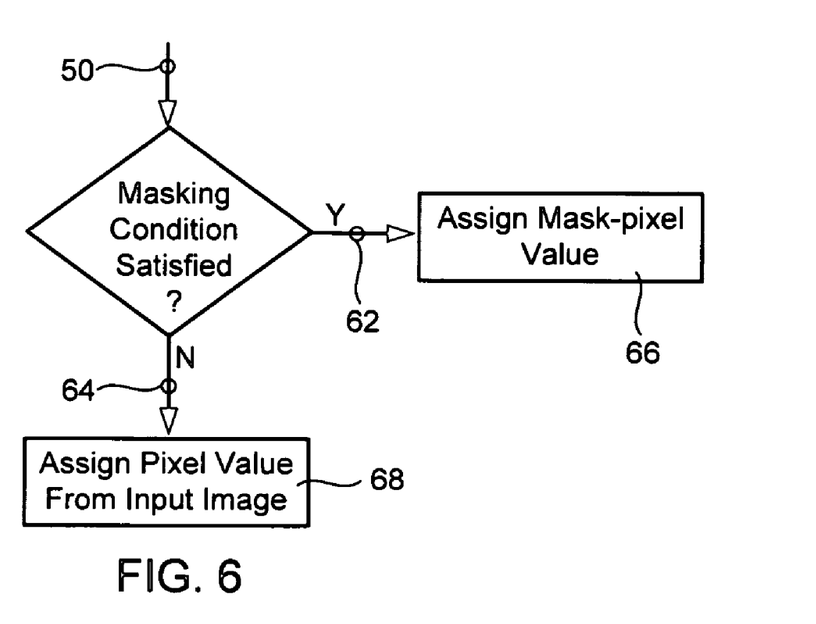
FIG. 6 is a diagram showing an exemplary embodiment of masked-image generation.

In exemplary embodiments of the present invention shown in FIG. 5, a masked image 51 may be formed 52 from an input image 50. The masked image may be formed by checking a masking condition at each pixel in the input image 50. An exemplary embodiment shown in FIG. 6, illustrates the formation of the masked image 52. If an input image pixel 60 satisfies the masking condition 62, the value of the pixel at the corresponding location in the masked image may be assigned a value, called a mask-pixel value, 66, indicating that the masking condition is satisfied at that pixel location in the input image. If an input image pixel 60 does not satisfy the masking condition 64, the value of the pixel at the corresponding location in the masked image may be assigned the value of the input pixel in the input image 68. The masked image thereby masks pixels in the input image for which a masking condition is satisfied.

Figure 7:
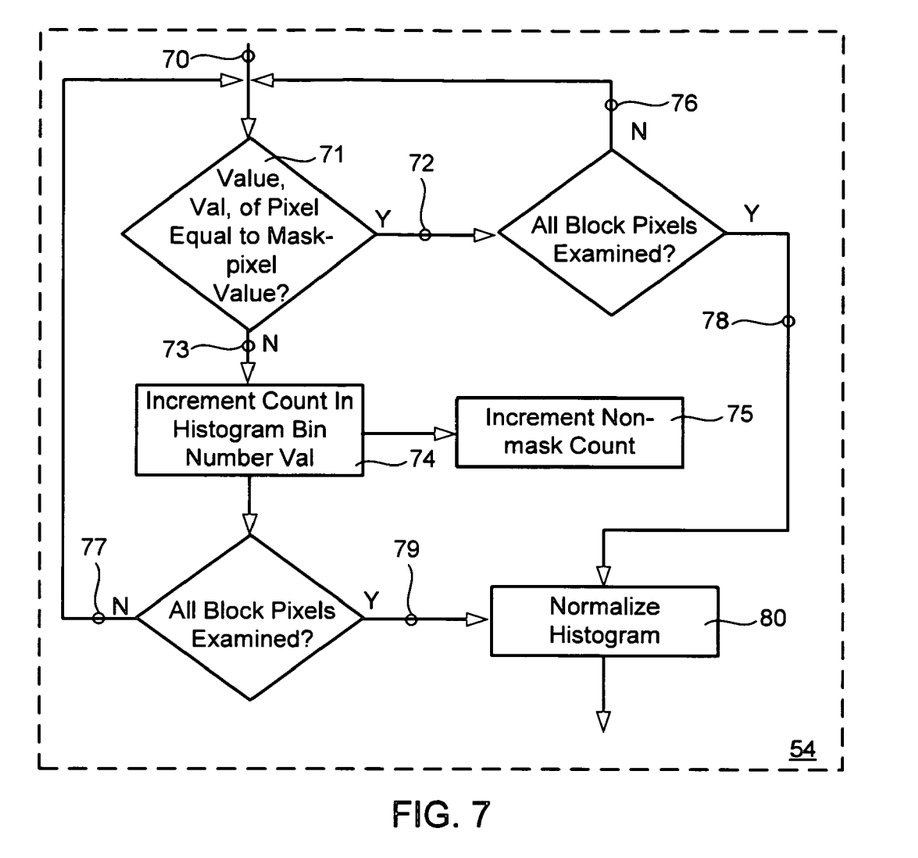
FIG. 7 is a diagram showing an exemplary embodiment of histogram generation.

In the exemplary embodiments of the present invention shown in FIG. 5, after forming 52 the masked image 51, a histogram 53 may be generated 54 for a block, also considered a segment, section, or any division, not necessarily rectangular in shape, of the masked image 51. For the purposes of this specification, associated claims, and included drawings, the term block will be used to describe a portion of data of any shape including, but not limited to, square, rectangular, circular, elliptical, or approximately circular. FIG. 7 shows an exemplary embodiment of histogram formation. A histogram with bins corresponding to the possible pixel values of the masked image may be formed according to FIG. 7. In some embodiments, all bins may be initially considered empty with initial count zero. The value of a pixel 70 in the block of the masked image may be compared 71 to the mask-pixel value. If the value of the pixel 70 is equal 72 to the mask-pixel value, then the pixel is not accumulated in the histogram, meaning that no histogram bin is incremented, and if there are pixels remaining in the block to examine 76, then the next pixel in the block is examined 71. If the value of the pixel 70 is not equal 73 to the mask-pixel value, then the pixel is accumulated in the histogram 74, meaning that the histogram bin corresponding to the value of the pixel is incremented, and if there are pixels remaining in the block to examine 77, then the next pixel is examined 71.

When a pixel is accumulated in the histogram 74, a counter for counting the number of non-mask pixels in the block of the masked image is incremented 75. When all pixels in a block have been examined 78, 79, the histogram may be normalized 80. The histogram may be normalized 80 by dividing each bin count by the number of non-mask pixels in the block of the masked image. In alternate embodiments, the histogram may not be normalized and the counter may not be present.

An entropy measure 55 may be calculated 56 for the histogram 53 of a block of the masked image. The entropy measure 55 may be considered an image feature of the input image. The entropy measure 55 may be considered any measure of the form:

$$-\sum_{i=1}^{N} h(i) * f(h(i)),$$

where N is the number of histogram bins, h(i) is the accumulation or count of bin i, and $f(\cdot)$ may be a function with mathematical characteristics similar to a logarithmic function. The entropy measure 55 may be weighted by the proportion of pixels that would have been counted in a bin, but were masked. The entropy measure is of the form:

$$-\sum_{i=1}^{N} w(i) h(i) * f(h(i))$$

where w(i) is the weighting function. In some embodiments of the present invention, the function $f(h(i))$ may be $\log_2(h(i))$.

In the embodiments of the present invention shown in FIG. 5, after calculating 56 the entropy measure 55 for the histogram 53 corresponding to a block of the image centered at a pixel, the pixel may be classified 57 according to the entropy feature 55. The classifier 57 shown in FIG. 5 may be based on thresholding. A threshold may be determined a priori, adaptively, or by any of numerous methods. The pixel may be classified 57 as belonging to one of two regions depending on which side of the threshold the entropy measure 55 falls.

Figure 8:
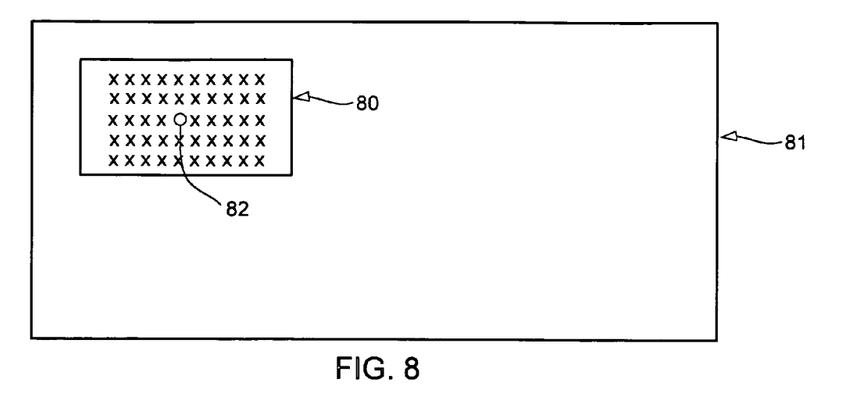
FIG. 8 is diagram showing pixel classification comprising an image window.

In some embodiments of the present invention, a moving window of pixel values centered, in turn, on each pixel of the image, may be used to calculate the entropy measure for the block containing the centered pixel. The entropy may be calculated from the corresponding block in the masked image. The entropy value may be used to classify the pixel at the location on which the moving window is centered. FIG. 8 shows an exemplary embodiment in which a block of pixels is used to measure the entropy feature which is used to classify a single pixel in the block. In FIG. 8, a block 80 is shown for an image 81. The pixels in the masked image in the corresponding block may be used to calculate the entropy measure. The pixel in the center of the image 82 may be classified according the entropy measure.

Figure 9:
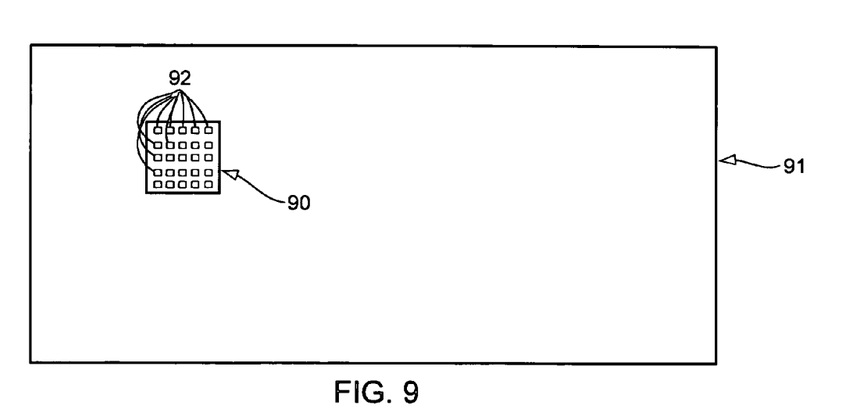
FIG. 9 is a diagram showing block classification comprising an image window.

In other embodiments of the present invention, the entropy value may be calculated for a block of the image, and all pixels in the block may be classified with the same classification based on the entropy value. FIG. 9 shows an exemplary embodiment in which a block of pixels is used to measure the entropy feature which is used to classify all pixels in the block. In FIG. 9, a block 90 is shown for an image 91. The pixels in the masked image in the corresponding block may be used to calculate the entropy measure. All pixels 92 in the block 90 may be classified according to the entropy measure.

In some embodiments of the present invention, the masking condition may be based on the edge strength at a pixel.

In some embodiments of the present invention, a level of confidence in the degree to which the masking condition is satisfied may be calculated. The level of confidence may be used when accumulating a pixel into the histogram. Exemplary embodiments in which a level of confidence is used are shown in FIG. 10.

Figure 10:
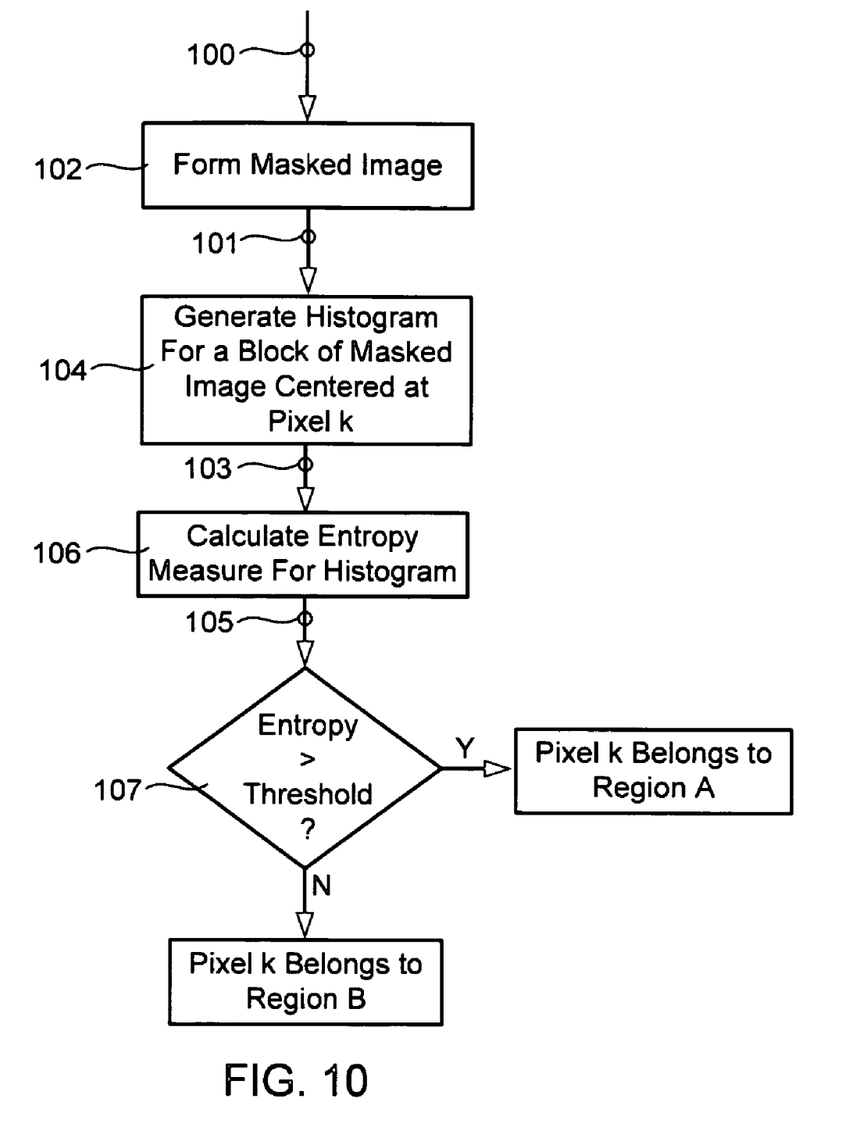
FIG. 10 is a diagram showing exemplary embodiments of the present invention comprising a masked-entropy calculation from a histogram using confidence levels.
Figure 11:
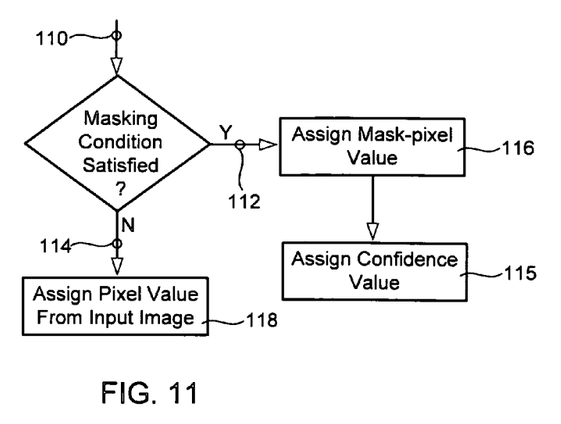
FIG. 11 is a diagram showing an exemplary embodiment of masked-image generation using confidence levels.

In exemplary embodiments of the present invention shown in FIG. 10, a masked image 101 may be formed 102 from an input image 100. The masked image may be formed by checking a masking condition at each pixel in the input image 100. An exemplary embodiment shown in FIG. 11, illustrates the formation of the masked image 102. If an input image pixel 110 satisfies the masking condition 112, the corresponding pixel in the masked image may be assigned a value, mask-pixel value, 116 indicating that the masking condition is satisfied at that pixel. If an input image pixel 110 does not satisfy the masking condition 114, the corresponding pixel in the masked image may be assigned the value of the corresponding pixel in the input image 118. At pixels for which the masking condition is satisfied 112, a further assignment 115 of a confidence value reflecting the confidence in the mask signature signal may be made. The assignment of confidence value may be a separate value for the masked pixels, or the mask-pixel value may be multi-level with the levels representing the confidence. The masked image may mask pixels in the input image for which a masking condition is satisfied, and further identify the level to which the masking condition is satisfied.

Figure 12:
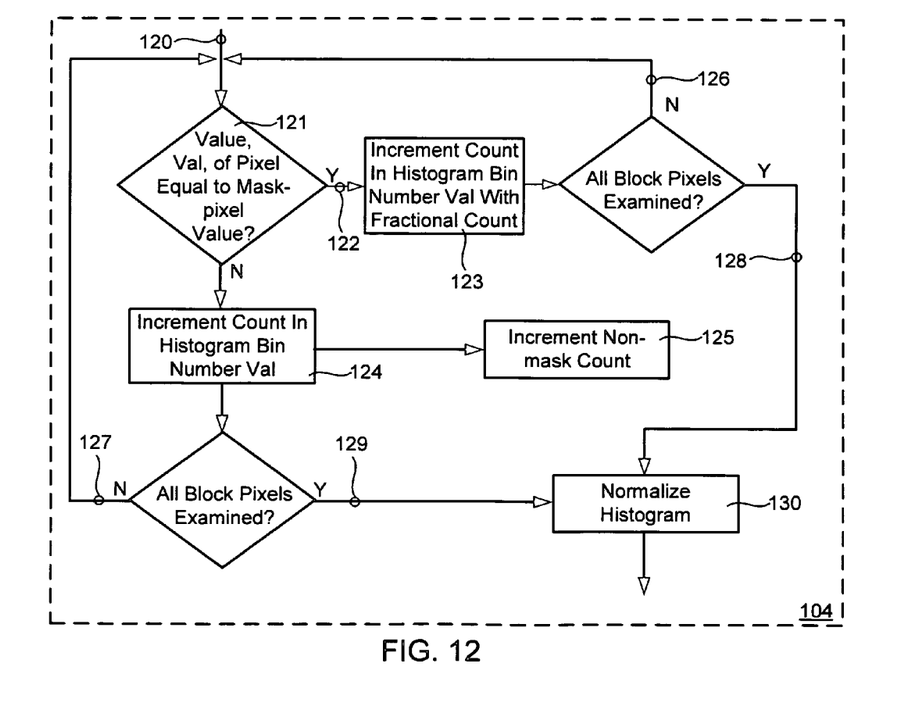
FIG. 12 is a diagram showing an exemplary embodiment of histogram generation using confidence levels.

In the exemplary embodiments of the present invention shown in FIG. 10, after forming 102 the masked image 101, a histogram 103 may be generated 104 for a block of the masked image 101. FIG. 12 shows an exemplary embodiment of histogram formation 104. A histogram with bins corresponding to the possible pixel values of the masked image may be formed according to FIG. 12. In some embodiments, all bins may be initially considered empty with initial count zero. The value of a pixel 120 in the block of the masked image may be compared 121 to the mask-pixel value. If the value of the pixel 120 is equal 122 to the mask-pixel value, then the pixel is accumulated 123 in the histogram at a fractional count based on the confidence value, and if there are pixels remaining in the block to examine 126, then the next pixel in the block is examined 121. If the value of the pixel 120 is not equal 123 to the mask-pixel value, then the pixel is accumulated in the histogram 124, meaning that the histogram bin corresponding to the value of the pixel is incremented, and if there are pixels remaining in the block to examine 127, then the next pixel in the block is examined 121.

When a pixel is accumulated in the histogram 124, a counter for counting the number of non-mask pixels in the block of the masked image is incremented 125. When all pixels in a block have been examined 128, 129, the histogram may be normalized 130. The histogram may be normalized 130 by dividing each bin count by the number of non-mask pixels in the block of the masked image. In alternate embodiments, the histogram may not be normalized and the counter not be present.

An entropy measure 105 may be calculated 106 for the histogram of a neighborhood of the masked image as described in the previous embodiments. In the embodiments of the present invention shown in FIG. 10, after calculating 106 the entropy measure 105 for the histogram 103 corresponding to a block of the image centered at a pixel, the pixel may be classified 107 according to the entropy feature 105. The classifier 107 shown in FIG. 10 may be based on thresholding. A threshold may be determined a priori, adaptively, or by any of numerous methods. The pixel may be classified 107 as belonging to one of two regions depending on which side of the threshold the entropy measure 105 falls.

In some embodiments of the present invention, the masking condition may comprise a single image condition. In some embodiments, the masking condition may comprise multiple image conditions combined to form a masking condition.

In some embodiments of the present invention, the entropy feature may be used to separate the image into two regions. In some embodiments of the present invention, the entropy feature may be used to separate the image into more than two regions.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

I claim:

1. A method for calculating an entropy feature in a digital image comprising a plurality of pixels, said method comprising:
    a) in a processor, applying a masking condition to said digital image thereby identifying masked pixels that satisfy said masking condition;
    b) in a calculator, calculating an entropy measure associated with a center pixel within a block of pixels in said digital image, wherein all masked pixels within said block contribute less to said entropy measure than pixels, within said block, not identified by said masking condition; and
    c) assigning a confidence value to a first masked pixel in said block, wherein said confidence value assigned to said first masked pixel reflects a confidence in a mask signature signal at said first masked pixel.

2. A method as described in claim 1 wherein said calculating excludes said all masked pixels within said block.

3. A method as described in claim 1 wherein said contribution of said first masked pixel is related to said assigned confidence value.

4. A method as described in claim 3 wherein said calculating comprises generating a histogram of pixel values.

5. A method as described in claim 1 wherein said calculating comprises generating a histogram of pixel values.

6. A method as described in claim 1 wherein said masking condition comprises edge strength.

7. A system for calculating an entropy feature in a digital image, said system comprising:
    a) processor for applying a masking condition to said digital image thereby identifying masked pixels that satisfy said masking condition;
    b) a calculator for calculating an entropy measure associated with a center pixel within a block of pixels in said digital image, wherein all masked pixels within said block contribute less to said entropy measure than pixels, within said block, not identified by said masking condition; and
    c) a confidence-value assigner for assigning a confidence value to a first masked pixel in said block, wherein said confidence value assigned to said first masked pixel reflects a confidence in a mask signature signal at said first masked pixel.

8. A system as described in claim 7 wherein said calculating excludes said all masked pixels within said block.

9. A system as described in claim 7 wherein said contribution of said first masked pixel is related to said confidence value.

10. A system as described in claim 9 wherein said calculator comprises a histogram generator for generating a histogram of pixel values.

11. A system as described in claim 10 wherein said histogram generator accumulates a pixel value associated with said first masked pixels based on said confidence value.

12. A system as described in claim 7 wherein said calculator comprises a histogram generator for generating a histogram of pixel values.

13. A system as described in claim 12 wherein said histogram generator accumulates pixel values from only pixels, from said block, for which said masking condition is not met.

14. A system as described in claim 7 wherein said masking condition comprises edge strength.

15. A method for detecting a region in a digital image, said method comprising:

a) in a region classifier, applying a masking condition to said digital image thereby identifying masked pixels that satisfy said masking condition;
   b) assigning a confidence value to a first masked pixel within a neighbor of said digital image, wherein said confidence value reflects a confidence in a mask signature signal at said first masked pixel;
   c) calculating an entropy measure associated with said neighborhood of said digital image, wherein all masked pixels within said neighborhood contribute less to said entropy measure than pixels, within said neighborhood, not identified by said masking condition; and
   d) classifying said neighborhood of said digital image based on said entropy measure.

16. A method as described in claim 15 wherein said calculating excludes said all masked pixels within said neighborhood.

* * * * *

UNITED STATES PATENT AND TRADEMARK OFFICE
CERTIFICATE OF CORRECTION

| | | |
|---|---|---|
| PATENT NO. | : 7,889,932 B2 | Page 1 of 1 |
| APPLICATION NO. | : 11/367244 | |
| DATED | : February 15, 2011 | |
| INVENTOR(S) | : Richard John Campbell | |

It is certified that error appears in the above-identified patent and that said Letters Patent is hereby corrected as shown below:

Claim 7, element a), line 1, should read a processor for applying a masking condition to said digi-

Col. 7 line 9, Claim 11, should read said first masked pixel based on said confidence value.

Signed and Sealed this
Tenth Day of May, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,889,932 B2 | Page 1 of 1 |
| APPLICATION NO. | : 11/367244 | |
| DATED | : February 15, 2011 | |
| INVENTOR(S) | : Richard John Campbell | |

It is certified that error appears in the above-identified patent and that said Letters Patent is hereby corrected as shown below:

Column 6, line 52 (Claim 7, element a), line 1) should read a processor for applying a masking condition to said digi-

Column 7 line 9 (Claim 11, line 3) should read said first masked pixel based on said confidence value.

This certificate supersedes the Certificate of Correction issued May 10, 2011.

Signed and Sealed this
Thirty-first Day of May, 2011

David J. Kappos
*Director of the United States Patent and Trademark Office*